United States Patent
Kelly et al.

(10) Patent No.: US 6,616,057 B1
(45) Date of Patent: Sep. 9, 2003

(54) ADAPTIVE AUTOMATIC CLIMATE CONTROL METHOD FOR A MOTOR VEHICLE

(75) Inventors: Sean Michael Kelly, Churchville, NY (US); John Lawrence Pawlak, III, Orchard Park, NY (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/085,907

(22) Filed: Feb. 28, 2002

(51) Int. Cl.⁷ .............................. G05D 23/00; F24F 7/00
(52) U.S. Cl. .................... 236/49.3; 236/91 C; 62/178
(58) Field of Search .................... 236/91 C, 91 D, 236/49.3, DIG. 9, 44 A, 44 C; 165/257, 244; 62/178, 186; 454/370

(56) References Cited

U.S. PATENT DOCUMENTS

| | | | |
|---|---|---|---|
| 5,511,724 A | 4/1996 | Freiberger et al. | 236/49.3 |
| 5,832,990 A * | 11/1998 | Eisenhour | 165/202 |
| 6,234,398 B1 * | 5/2001 | Pawlak, III et al. | 236/91 C |
| 6,435,417 B1 * | 8/2002 | Holdgrewe et al. | 236/46 |
| 6,454,178 B1 * | 9/2002 | Fusco et al. | 236/49.3 |

* cited by examiner

Primary Examiner—Marc Norman
(74) Attorney, Agent, or Firm—Patrick M. Griffin

(57) ABSTRACT

An improved motor vehicle automatic climate control methodology individually develops climate control commands in response to ambient environmental conditions and a transient state estimator, and individually and adaptively adjusts the commands to improve driver comfort in response to driver override of respective automatic control settings. The adaptive adjustment of the climate control commands is carried by CMAC neural networks that take into account the environmental conditions and the dynamic state of the system when the respective overrides occur so as to minimize or eliminate the environmental state ambiguity and steady-state/transient coupling that occur in currently known control methodologies.

16 Claims, 2 Drawing Sheets

ADAPTIVE AUTOMATIC CLIMATE CONTROL METHOD FOR A MOTOR VEHICLE

TECHNICAL FIELD

This invention relates to the control of an automatic climate control system for a motor vehicle, and more particularly to a control that is adaptively adjusted to reflect vehicle occupant preferences.

BACKGROUND OF THE INVENTION

In vehicles equipped with an automatic climate control system, the driver or other occupant adjusts a "set temperature" for the vehicle cabin, and an electronic control module responds in a pre-programmed way to control the blower speed, air discharge temperature and air delivery mode (outlet vent).

Typically, the control is based not only on the set temperature (Tset), but also on a number of measured parameters such as outside air temperature (Tamb), solar loading (Tsolar), and cabin air temperature (Tin-car). FIGS. 1A–1B illustrate a conventional control in which Tset, Tamb, Tsolar and Tin-car are combined with a constant K to form a Program Number (PN) for scheduling desired values of blower speed, air discharge temperature and air delivery mode. As indicated, PN decreases in response to increasing values of Tamb, Tsolar and Tin-car to provide increased cooling, and PN increases in response to increasing values of Tset to provide increased heating. The control responses illustrated in FIG. 1B are heuristically determined for occupant comfort at steady-state conditions, and an initial high or low value of Tin-car following a hot-soak or cold-soak condition has the effect of initiating a transient cool-down or heat-up period.

Obviously, the above-described approach (or any other pre-programmed approach) cannot satisfy every individual. In a given environmental condition, for example, some people are more comfortable with a low blower speed, while others are more comfortable with a high blower speed. For this reason, the system control panel includes an operator interface for overriding the automatic control settings; in such case, the overridden setting (blower speed, for example) is maintained until automatic control is re-instituted. However, the need for operator overriding negates the advantages of an automatic control, and it would be better if the automatic control settings could somehow adapt or automatically tune to the preferences of the operator. One such adaptive system is disclosed in the U.S. Pat. No. 5,511,724 to Freiberger et al., issued on Apr. 30, 1996 and assigned to the assignee of the present invention. In Freiberger et al., control adaptation based on operator overrides is achieved in the context of a program number (PN) control strategy by adjusting the constant K by an offset value adaptively determined based on operator adjustment of Tset, and adjusting the scheduled blower speed by an offset value adaptively determined based on operator override of the blower speed. While such a control provides some improvement, its utility is limited for at least two reasons: (1) steady-state/transient coupling, and (2) environmental state ambiguity. The first reason—steady-state/transient coupling—refers to the fact that the same control table values (i.e., the traces illustrated in FIG. 1B) are used during both steady-state and transient (i.e., cool-down and warm-up) operating conditions. Thus, adaptive changes made during steady-state operation also affect transient operation, and vice-versa. The second reason—environmental state ambiguity—refers to the fact that any number of different environmental conditions can result in the same program number PN, and therefore, the same control response. Thus, adaptive changes made for one set of environmental conditions may well produce a response that is inappropriate for a different set of environmental conditions. Accordingly, what is desired is an improved adaptive climate control methodology that does not suffer from these limitations.

SUMMARY OF THE INVENTION

The present invention is directed to an improved motor vehicle automatic climate control methodology in which climate control commands are individually developed in response to ambient environmental conditions and a transient state estimator, and individually and adaptively adjusted to improve driver comfort in response to driver overrides of the respective automatic control settings. The adaptive adjustment of the climate control commands is carried out by CMAC Neural Networks that take into account the environmental conditions and the dynamic state of the system when the respective overrides occur so as to minimize or eliminate the environmental state ambiguity and steady-state/transient coupling that occur in currently known control methodologies.

BRIEF DESCRIPTION OF THE DRAWINGS

FIG. 1A illustrates formulation of a Program Number, and FIG. 1B illustrates pre-programmed control settings based on the formulated Program Number.

DESCRIPTION OF THE PREFERRED EMBODIMENT

Figure 1A:
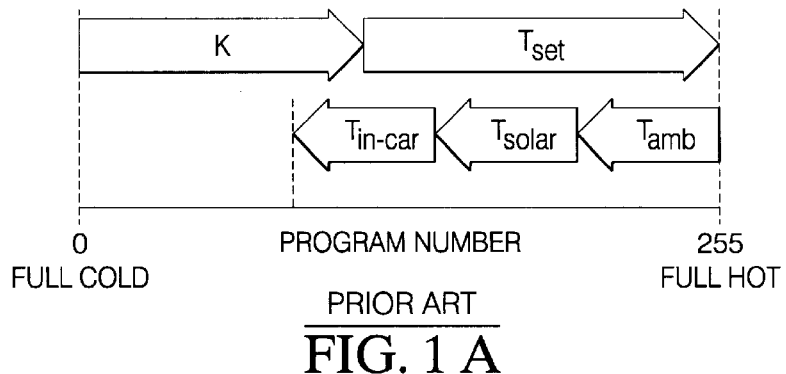
FIGS. 1A and 1B illustrate a program number control methodology carried out by a prior art motor vehicle automatic climate control system.
Figure 1B:
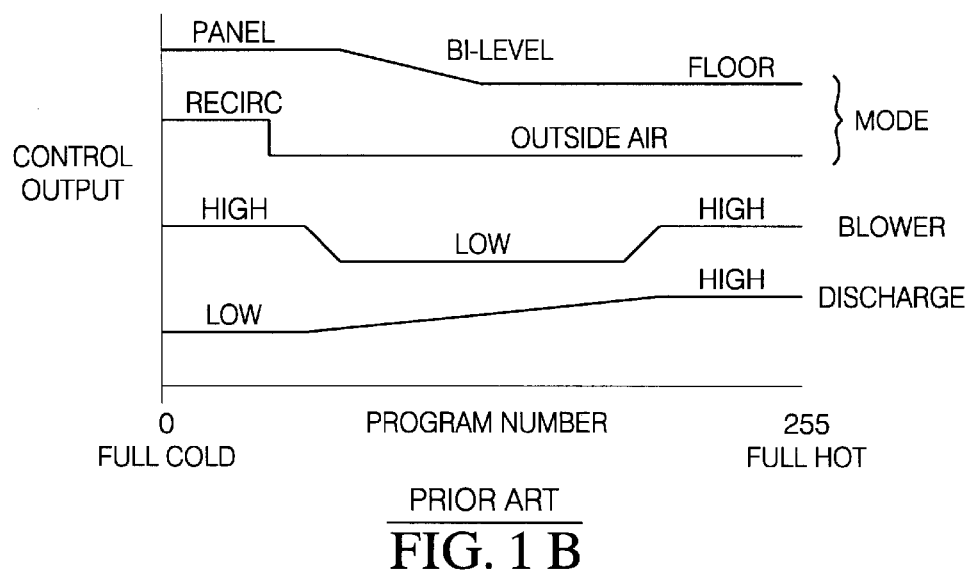
Figure 2:
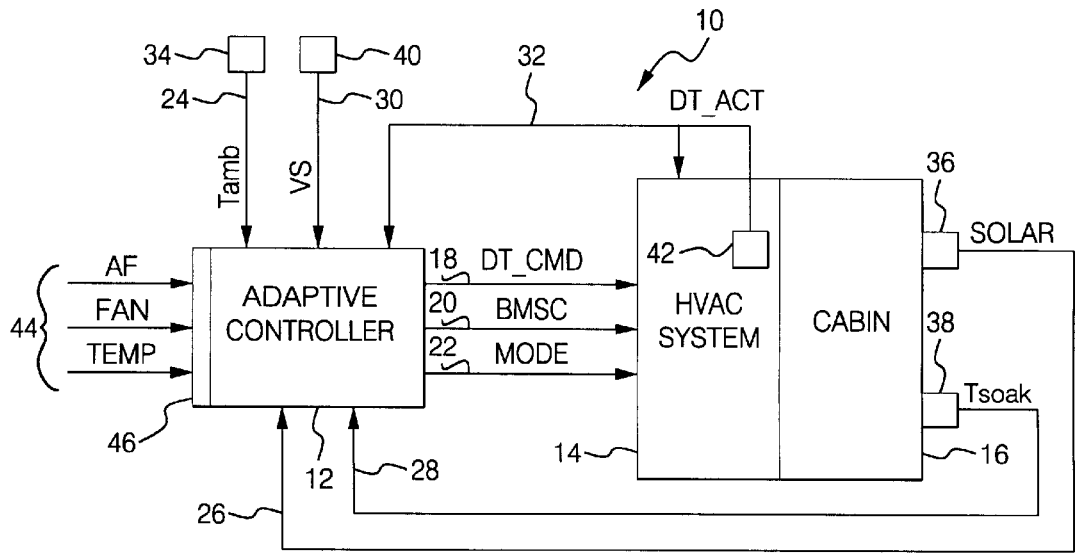
FIG. 2 is a block diagram illustrating a motor vehicle automatic climate control system, including an adaptive controller according to this invention.

Referring to FIG. 2, the reference numeral 10 generally designates a motor vehicle automatic climate control system according to this invention, including an adaptive controller 12 and a heating, ventilation and air-conditioning (HVAC) system 14 adapted to deliver conditioned air to a vehicle cabin 16. The controller 12 is responsive to various environmental and operator-generated inputs for developing and outputting a set of climate control commands (DT_CMD, BMSC, MODE) on lines 18, 20 and 22. The environmental inputs include ambient temperature Tamb on line 24, solar vector SOLAR on line 26, and cabin soak temperature Tsoak on line 28. Additional inputs utilized to estimate the cabin temperature (Tin-car) include vehicle speed VS on line 30, and the HVAC air discharge temperature DT_ACT on line 32 (which is also supplied to HVAC system 14, as shown). Sensors 34, 36, 38, 40, 42 for developing the above-mentioned inputs may be purely conventional. The operator-generated inputs are generally designated by the reference numeral 44, and are received by an operator interface panel 46 coupled to controller 12. The inputs 44, which include temperature TEMP, fan speed FAN, and airflow AF, are regarded as manual overrides of the automatic control, and are utilized both to change and adaptively adjust the climate control commands on lines 18, 20, 22, as explained below.

The HVAC system 14 includes various elements of a conventional automotive HVAC system, and responds to the commands on lines 18, 20, 22 in a conventional fashion. For example, HVAC system 14 includes a refrigerant compressor which may be driven by the vehicle engine and a heater core which may be coupled to the engine coolant. A control mechanism is employed for regulating the heater core coolant flow and/or the compressor capacity and/or mix control doors to satisfy the discharge temperature command (DT_CMD) on line 18. Airflow is generated by a blower driven by a blower motor, and a control circuit drives the blower motor to satisfy the blower motor speed command (BMSC) on line 20. A set of mode control doors and a control mechanism for positioning the mode control doors is employed to satisfy the mode command (MODE) on line 22.

Figure 3:
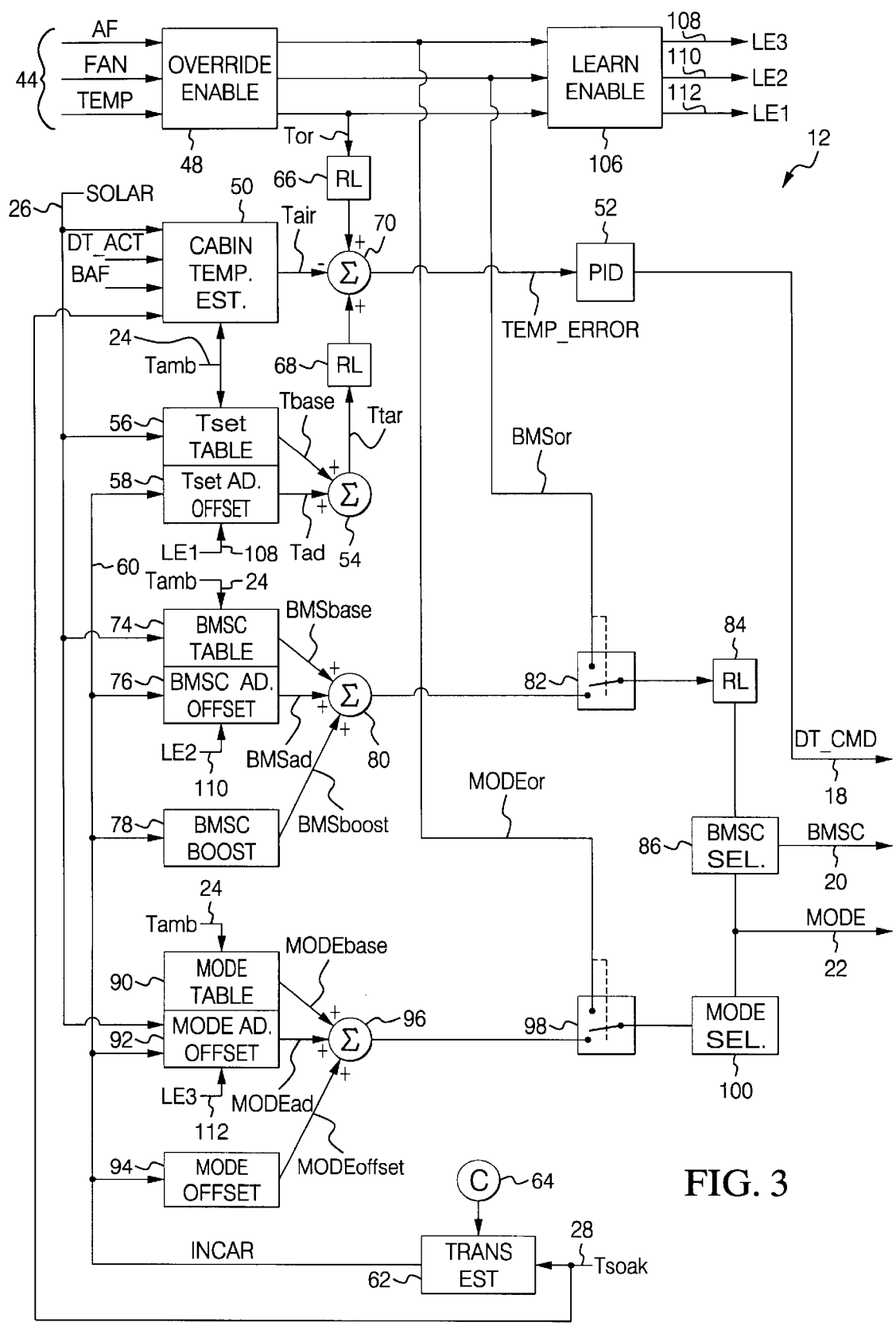
FIG. 3 is a block diagram detailing the adaptive controller of FIG. 2.

The block diagram of FIG. 3 explains how the adaptive controller 12 develops the climate control commands DT_CMD, BMSC, and MODE. In general, each of the commands is determined by combining a calibrated baseline value with an adaptive offset and a transient modifier, and in each case, the adaptive offset is determined using a dedicated Cerebellar Model Arithmetic Computer (CMAC) Neural Network. Additionally, the driver override inputs 44 are applied to override enable block 48, which under steady-state operating conditions, allows an active override input(s) to influence the respective climate control command(s).

The discharge air temperature command DT_CMD is developed by the blocks 50, 52, 54, 56, 58, 66, 68 and 70. In general, the block 50 develops an estimate of the cabin air temperature (Tair), which is subtracted from a target temperature (Ttar) developed by blocks 54, 56 and 58, and adjusted for driver temperature overrides (Tor) if any, to determine the cabin temperature error TEMP_ERROR. The term TEMP_ERROR, in turn, is applied to a PID controller 52 which develops a discharge temperature command DT_CMD for driving TEMP_ERROR to zero.

The block 50 designates a cabin air temperature state estimator responsive to a number of inputs including solar loading SOLAR, measured discharge air temperature DT_ACT, the cabin soak temperature Tsoak, ambient temperature Tamb, and blower airflow BAF. The blower airflow BAF may be measured, but is preferably estimated based on the voltage supplied to the HVAC blower motor, vehicle speed, and current HVAC mode. The soak temperature Tsoak may be obtained from a cabin air temperature sensor 38 as illustrated in FIG. 2, or modeled based on Tamb, SOLAR, and so on. In the illustrated embodiment, the cabin air temperature Tair is modeled by a set of three equations describing the rate of change of temperature at three nodes (air, interior surface and deep-core) of the cabin 16. Specifically, the temperature rates $T_{air}\_DOT$, $T_{surf}\_DOT$ and $T_{deep}\_DOT$ at the air, interior surface and deep-core nodes are defined as follows:

$$T_{air}\_DOT=[(T_{surf}-T_{air})/(R_{surf}*C_{air})]+[(T_{dis}-T_{air})/(R_{flow}*C_{air})]+[(T_{amb}-T_{air})/(R_{amb}*C_{air})]$$

$$T_{surf}\_DOT=(Q_{solar}/C_{surf})+[(T_{air}-T_{surf})/(R_{surf}*C_{surf})]+[(T_{deep}-T_{surf})/(R_{deep}*C_{surf})]$$

$$T_{deep}\_DOT=[(T_{surf}-T_{deep})/(R_{deep}*C_{deep})]+[(T_{amb}-T_{deep})/(R_{d2amb}*C_{deep})]$$

In the above equations, $C_{surf}$ represents the thermal capacitance of surfaces in the cabin 16, $C_{air}$ represents the thermal capacitance of the cabin air, and $C_{deep}$ represents the thermal capacitance of the deep-core node of cabin 16; $R_{amb}$ represents the thermal resistance of the cabin air to ambient, $R_{surf}$ represents the thermal resistance of the cabin air to cabin surfaces, $R_{deep}$ represents the thermal resistance of interior surfaces to the deep-core node, and $R_{d2amb}$ represents the thermal resistance from the deep-core node to ambient. Additionally, $T_{dis}$ represents the air discharge temperature DT_ACT, $Q_{solar}$ represents the solar loading, and the term $R_{flow}$ is given by:

$$R_{flow}=1/(BAF*C_{p,air})$$

where $C_{p,air}$ is the specific heat property of the air at the discharge temperature DT_ACT. Thus, given an initial state, a set of R and C parameters, and the SOLAR, Tamb, BAF and DT_ACT inputs, the above equations may be periodically solved to update the cabin air temperature estimate Tair.

The target temperature Ttar is developed at the output of summer 54 as shown, and is determined according to the sum of a baseline set temperature Tbase obtained from baseline temperature look-up table or function 56 and a learned adaptive offset Tad obtained from adaptive set temperature look-up table or CMAC Neural Network 58. The baseline set temperature Tbase may be a fixed value, but is preferably calibrated as a function of Tamb and SOLAR to match the desires of a typical driver. Additionally, the SOLAR input may be a vector quantity as mentioned above so that the table 56 can output different baseline set temperatures for different zones of the cabin 16, if desired. The adaptive set temperature Tad is stored in look-up table or CMAC Neural Network 58 as a function of Tamb, SOLAR, and a transient cabin temperature term referred to herein as INCAR. In FIG. 3, the term INCAR appears on line 60, and is developed as a function of Tsoak and elapsed time t by transient estimator (TRANS EST) block 62. In the illustrated embodiment, INCAR is initialized at Tsoak, and exponentially decays to a fixed steady-state value (75 degrees F., for example) at a time constant τ. Algebraically, INCAR is given as:

$$INCAR=Tss+(Tsoak-Tss)*EXP$$

where Tss is the steady-state temperature, and the term EXP is an exponential factor having a value of $e^{-t/\tau}$. The clock input 64 provides the elapsed time to estimator block 62. The temperature offset values are stored in adaptive look-up table or CMAC Neural Network 58, as mentioned above and explained below.

The temperature override term Tor and the target temperature Ttar are applied to rate limiting (RL) blocks 66 and 68, and then to summer 70 along with the estimated cabin air temperature Tair to form the cabin temperature error TEMP_ERROR. As indicated, summer 70 performs the function:

$$TEMP\_ERROR=Ttar'+Tor'-Tair$$

where the Tor and Ttar terms are primed to indicate the rate limiting effect of blocks 66 and 68, respectively.

The commanded blower motor speed BMSC on line 20 is developed by blocks 74, 76, 78, 80, 82, 84 and 86. In general, the blocks 74, 76, and 78 respectively develop baseline, adaptive and transient boost blower motor speed values (BMSbase, BMSad, BMSboost), which are summed by summer 80 and then rate limited by block 84 to form the nominal blower speed command. In the case of a driver override, the block 82 replaces the output of summer 80 with an override value (BMSor), and in any event, the block 86 may restrict the command BMSC to a MODE-dependent value (i.e., minimum blower speeds for selected modes).

The baseline blower motor speed BMSbase is stored in baseline look-up table 74, and is calibrated as a function of Tamb and SOLAR to match the desires of a typical driver. The adaptive blower motor speed BMSad is stored in adaptive speed offset look-up table or CMAC Neural Network 76 as a function of Tamb, SOLAR, and the transient cabin temperature term INCAR developed by block 62. The adaptive values stored in table 76 are periodically updated as mentioned above and explained below. The transient boost blower motor speed BMSboost developed at block 78 is a function of the transient cabin temperature term INCAR, and serves to temporarily elevate the commanded blower motor speed during warm-up and cool-down transient intervals.

Finally, the mode command MODE on line 22 is determined by the blocks 90, 92, 94, 96, 98 and 100. In general, the blocks 90, 92 and 94 develop baseline, adaptive and transient offset mode values (MODEbase, MODEad, MODEoffset), which are summed by summer 96 to form a mode number. In the case of a driver override, the block 98 replaces the output of summer 96 with an override mode number (MODEor), and in any event, the block 100 uses the respective mode number to determine a corresponding mode command MODE.

The baseline mode number MODEbase is stored in baseline look-up table 90, and is calibrated as a function of Tamb and SOLAR to provide adequate windshield de-fogging and to match the desires of a typical driver. The adaptive mode number MODEad is stored in adaptive mode offset look-up table or CMAC Neural Network 92 as a function of Tamb, SOLAR, and the transient cabin temperature term INCAR developed by block 62. The adaptive values stored in table 92 are periodically updated as mentioned above and explained below. The transient mode number offset MODEoffset developed at block 94 is a function of the transient cabin temperature term INCAR, and serves to temporarily bias the mode number toward predetermined mode settings during warm-up and cool-down transient intervals.

As indicated above, the values supplied by blocks 58, 76 and 92 are stored in adaptive look-up tables or CMAC Neural Networks. The values are read periodically for control purposes, and new values may be stored from a training set created in response to a driver override. A detailed discussion of CMAC neural networks and their application is found in a paper authored by Miller and Glanz, published by the University of New Hampshire on Aug. 31, 1994, and entitled "The University of New Hampshire Implementation of the Cerebellar Model Arithmetic Computer—CMAC", such paper being incorporated herein by reference. In general, the CMAC has an internal grid structure that maps a set of input vectors into a single output value with stored weighting values deduced from an initial set of training data. As applied to FIG. 3, for example, the CMAC of block 58 is initially trained to map different combinations of Tamb, SOLAR and INCAR into respective values of Tad. When an operator override of the TEMP input occurs in subsequent operation of the system, it means that the target temperature Ttar developed by blocks 54, 56 and 58 failed to produce a cabin temperature that satisfied the driver. If the learn enable block 106 determines that learning enable criteria have been met, the output LEI on line 112 is activated to trigger adaptive updating of the CMAC weighting values stored in block 58 based on the TEMP override so that the output Tad for the current set of inputs (Tamb, SOLAR, INCAR) changes to drive the target temperature Ttar in a direction that more nearly satisfy the driver's expectations as communicated by the TEMP override. A principle learning enable criterion involves determining if the HVAC system 14 is capacity limited. For example, adaptive updating of the table 58 is not triggered in response to a TEMP driver override requesting a cooler cabin temperature if the system 14 is already operating at full cold output.

The above-described process similarly occurs in blocks 76 and 92 when the driver overrides the blower and/or airflow inputs FAN, AF, and the respective outputs LE2, LE3 of block 106 on lines 110, 108 are activated to trigger adaptive learning. In this way, the climate control commands DT_CMD, BMSC, MODE are adaptively adjusted on an individual basis to more nearly satisfy the driver, thereby reducing the need for manual overriding of the automatic control.

In practice, the adaptive table values of blocks 58, 76 and 92 need not be updated each time a corresponding driver override occurs. Instead, the blocks 58, 76, 92 can record a new training example (desired output for a given set of inputs) at each driver override, and maintain such training example in a queue if there are no further driver overrides of the corresponding input (AF, FAN or MODE) for a predetermined period of time. Then, at an opportune time, the training examples stored in the queue are submitted to the respective CMAC Neural Network for network training. For example, network training for blower motor speed and mode may occur at any time during the driver override, since the climate control commands BMSC, MODE are based solely on the respective override values BMSor, MODEor so long as the driver override is effective. On the other hand, network training for the cabin temperature may be scheduled to occur after a prescribed period of non-activity, such as an overnight soak period.

In summary, the automatic climate control of this invention individually develops climate control commands regulating the discharge air temperature, the blower speed and the HVAC mode in response to ambient environmental conditions and a transient condition estimator, and individually and adaptively adjusts the developed commands to improve driver comfort in response to driver override of the corresponding automatic control settings. The adaptive adjustment of the climate control commands is carried by CMAC Neural Networks that take into account the environmental conditions and the dynamic state of the system when the respective override occurs to minimize or eliminate environmental state ambiguity and steady-state/transient coupling. While this invention has been described in reference to the illustrated embodiment, it is expected that various modifications in addition to those suggested above will occur to those skilled in the art. For example, the control of this invention may be applied to additional or fewer climate control commands. Also, if the vehicle is equipped with means for identifying specific drivers, adaptations specific to a given driver may be recorded and stored. Accordingly, it should be understood that the scope of this invention is not limited to the illustrated embodiment, and that controls incorporating such modifications may fall within the intended breadth of the appended claims.

What is claimed is:

1. A method of operation for an automatic climate control system for a cabin of a motor vehicle, comprising the steps of:
   measuring environmental conditions including ambient temperature and solar loading;
   estimating a transient state of said automatic climate control system based on a soak temperature of said cabin upon commencement of a period of vehicle operation and a nominal steady-state temperature of said cabin;

developing baseline control settings for each of a plurality of climate control parameters based on the measured environmental conditions;

detecting driver overriding of one or more of said climate control parameters; and in response to said detected driver overriding:
    modifying the baseline control setting for each overridden climate control parameter;
    storing a training example based on the driver overriding, the measured environmental conditions, and said estimated transient state when the overriding occurs; and
    revising an adaptive adjustment of the baseline control setting for each overridden climate control parameter based on the stored training example.

2. The method of claim 1, including the step of:

estimating said transient state in accordance with an exponential function having an initial value that corresponds to said soak temperature, and a final value that corresponds to said nominal steady state temperature.

3. The method of claim 2, wherein the exponential function is determined according to:

$$TEMPtar+(TEMPinit-TEMPtar)*EXP$$

where TEMPtar is said nominal steady state temperature, TEMPinit is said soak temperature, and EXP is an exponential factor determined as a function of an elapsed time and an expected rate of change in cabin temperature.

4. The method of claim 1, wherein the climate control parameter is cabin temperature and the baseline control setting for cabin temperature is a target cabin temperature based on the measure environmental conditions and the estimated transient state of the system.

5. The method of claim 4, including the step of:

detecting driver overriding of the cabin temperature; and in response to a detected driver overriding of cabin temperature:
    modifying the target cabin temperature based on the detected driver overriding of cabin temperature;
    storing a training example based on the driver override of cabin temperature, the measured environmental conditions, and the estimated transient state of the system when the detected driver override occurs; and
    revising an adaptive adjustment of the target cabin temperature based on the stored training example.

6. The method of claim 5, wherein the step of revising the adaptive adjustment of the target cabin temperature is inhibited if the system is capacity limited when the detected driver override occurs.

7. The method of claim 5, including the step of:

using a CMAC Neural Network to revise the adaptive adjustment of said target cabin temperature.

8. The method of claim 1, wherein the climate control parameter is blower speed and the baseline control setting for blower speed is a target blower speed based on the measured environmental conditions and the estimated transient state of the system.

9. The method of claim 8, including the step of:

detecting driver overriding of blower speed; and in response to a detected driver overriding of blower speed:
    modifying the target blower speed based on the detected driver overriding of blower speed;
    storing a training example based on the driver override of blower speed, the measured environmental conditions, and the estimated transient state of the system when the detected driver override occurs; and
    revising an adaptive adjustment of the target blower speed based on the stored training example.

10. The method of claim 9, including the step of:

using a CMAC Neural Network to revise the adaptive adjustment of said target blower speed.

11. The method of claim 8, wherein the target blower speed includes a base blower speed component based on the measured environmental conditions and a transient blower speed component based on the estimated transient state of the system.

12. The method of claim 8, including the steps of:

establishing a minimum blower speed based on an air discharge mode of said system; and preventing adjustment of the target blower speed below said minimum blower speed.

13. The method of claim 1, wherein the climate control parameter is air discharge mode and the baseline control setting for air discharge mode is a target mode setting based on the measured environmental conditions and the estimated transient state of the system.

14. The method of claim 13, including the step of:

detecting driver overriding of air discharge mode; and in response to a detected driver overriding of air discharge mode:
    modifying the target mode setting based on the detected driver overriding of air discharge mode;
    storing a training example based on the driver override of air discharge mode, the measured environmental conditions, and the estimated transient state of the system when the detected driver override occurs; and
    revising an adaptive adjustment of the target mode setting based on the stored training example.

15. The method of claim 14, including the step of:

using a CMAC Neural Network to revise the adaptive adjustment of said target mode setting.

16. The method of claim 1, including the step of:

using a CMAC Neural Network to revise the adaptive adjustment of said baseline control settings.

* * * * *